United States Patent
Iyer et al.

(10) Patent No.: US 9,141,443 B2
(45) Date of Patent: Sep. 22, 2015

(54) METHOD AND SYSTEM FOR INTEGRATING VISUAL CONTROLS WITH LEGACY APPLICATIONS

(71) Applicant: General Electric Company, Schenectady, NY (US)

(72) Inventors: Giridhar Iyer, Canton, GA (US); Venu Tadepalli, Alpharetta, GA (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 13/735,794

(22) Filed: Jan. 7, 2013

(65) Prior Publication Data

US 2014/0196061 A1    Jul. 10, 2014

(51) Int. Cl.
*G06F 13/00* (2006.01)
*G06F 9/54* (2006.01)
*G06F 3/01* (2006.01)

(52) U.S. Cl.
CPC ............... *G06F 9/541* (2013.01); *G06F 3/017* (2013.01)

(58) Field of Classification Search
CPC .................. G06F 3/04883; G06F 9/45512
USPC .......................... 719/320; 715/863
See application file for complete search history.

(56) References Cited

U.S. PATENT DOCUMENTS

| | | | |
|---|---|---|---|
| 6,208,341 B1* | 3/2001 | van Ee et al. ............ | 715/716 |
| 2008/0104547 A1* | 5/2008 | Morita et al. ............ | 715/863 |
| 2010/0332979 A1* | 12/2010 | Xu et al. ................ | 715/704 |
| 2011/0055846 A1* | 3/2011 | Perez et al. ............. | 719/313 |
| 2011/0107216 A1* | 5/2011 | Bi ........................ | 715/716 |
| 2013/0222232 A1* | 8/2013 | Kong et al. .............. | 345/156 |
| 2013/0324248 A1* | 12/2013 | Wilson et al. ............ | 463/31 |
| 2014/0085318 A1* | 3/2014 | Nadar et al. ............. | 345/502 |

* cited by examiner

*Primary Examiner* — Andy Ho
(74) *Attorney, Agent, or Firm* — Parks Wood LLC; Stephen J. Terrell

(57) ABSTRACT

A method is provided for controlling a legacy application. The method includes visually capturing a series of movements. The method also includes recording the series of movements at a first time as a recorded series of movements. Moreover, the recorded series of movements includes at least a command that is configured to control a legacy application. Furthermore, the method includes invoking the recorded series of movements at a second time.

20 Claims, 3 Drawing Sheets

METHOD AND SYSTEM FOR INTEGRATING VISUAL CONTROLS WITH LEGACY APPLICATIONS

BACKGROUND OF THE INVENTION

The subject matter disclosed herein relates to integrating visual controls with legacy applications.

Computer control applications may be used to control industrial systems. These computer control systems may be also be used to control various computer applications (e.g., power network management applications). However, often these computer control applications (e.g., legacy applications) may not suitably interface with newer computer control applications (e.g., applications using visual controls). Thus, to use such legacy computer applications with a visual computer control application, the legacy computer applications and/or the visual computer control applications often must be modified to create an interface (e.g., application programming interface [API]) suitable for communicating between the two applications. However, creating the API and/or modifying the legacy computer application and/or the visual control application to interface between the applications can be costly and time intensive.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a method for controlling a legacy application includes visually capturing a series of movements. The method also includes recording the series of movements at a first time as a recorded series of movements. Moreover, the recorded series of movements includes at least a command that is configured to control a legacy application. Furthermore, the method includes invoking the recorded series of movements at a second time.

In another embodiment, a system includes at least one processor and a memory communicatively coupled to the at least one processor. The system also includes an image capturing device configured to record a series of movements as a recorded series of movements in the memory at a first time as a recorded series of movements. Moreover, the recorded series of movements includes at least a command that is configured to control a legacy application. Furthermore, the system includes an input interface configured to invoke the recorded series of movements at a second time.

In a further embodiment, a visual control apparatus includes an image capture device configured to capture a series of movements as a recorded series of movements. The visual control apparatus also includes a memory configured to record the series of movements as a recorded series of movements. Moreover, the recorded series of movements includes at least a command that is configured to control a legacy application. Furthermore, the visual control apparatus comprises a user interface configured to invoke or to edit the recorded series of movements.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Control applications may use APIs to communicate with legacy applications. However, in certain systems, the use of APIs may be cumbersome and inefficient and/or the APIs may be costly to design and update. For example, certain visual control systems may capture visual movements (e.g., hand movements, facial expressions, wand movements) of a user, but a visual control system using APIs to interact with legacy applications might use specifically designed APIs for each legacy application for which the visual control system may communicate. The techniques disclosed herein provide for the capture of such movements and audio (e.g., voice commands) and use the movements to control legacy applications without making direct changes to the code of legacy applications or requiring the development of an API for the legacy application of the visual control system. Accordingly, different legacy applications may be controlled by the visual control system more efficiently than systems that use specific API development for each interface for each legacy application. Additionally, the techniques include saving, editing, and/or naming the series of movements that may be recalled by a user at a later time. By saving and recalling a recorded series of movements, the visual control system allows a user to be more productive by allowing the user to invoke commands without performing each of the precise movements used to achieve a desired result.

Figure 1:
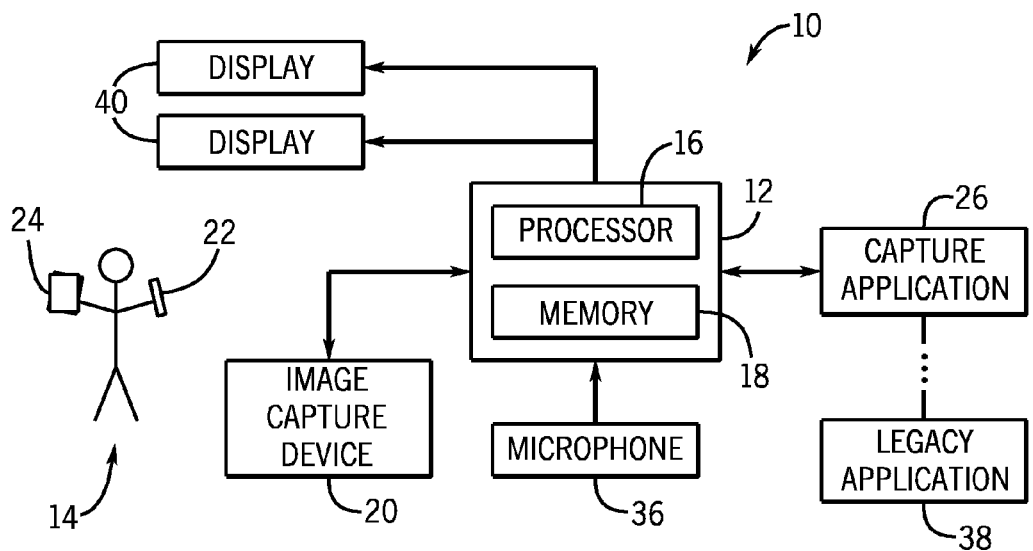
FIG. 1 illustrates a schematic view of an embodiment of a visual control system having a display and a capture application.

FIG. 1 illustrates an embodiment of a visual control system 10 that includes a computing device 12 that may be capable of capturing movements of a user 14 and translating the movements into useable commands. In certain embodiments, the computing device 12 may include a personal computer (e.g., a laptop or a desktop), a server, a workstation, a netbook, a personal digital assistant, a mainframe, a tablet computer, a cellular phone, and/or another suitable processor based-device. In various embodiments, the computing device 12 includes a processor 16 and a memory 18 either included in the computing device 12 or accessible to the computing device 12 through a network connection, such as local area network (LAN) connections, wide area network (WAN) connections, Internet connections (cloud computing connections), wireless connections, wired connections, or other connections (e.g., Bluetooth connections, personal area networks (PANs), near field communication (NFC) networks). In certain embodiments, the processor 16 may include more than one processor. Moreover, the processor 16 may refer to a central processing unit (CPU), microprocessor, graphics processing unit (GPU), front end processor, another suitable processor, and/or a combination thereof. Similarly, the memory 18 may include volatile memory (e.g., random accessible memory (RAM)) and/or non-volatile memory. Additionally, the various embodiments of the invention include storing the below described functions in the memory 18 as instructions and executing the instructions using the processor 16.

The visual control system 12 also includes an image capture device 20 that may be integrated within the computing device 12 or peripheral to the computing device 12 (e.g., connected via a universal serial bus or other connection, such as the connections mentioned above). In various embodiments, the image capture device 20 may include any device capable of capturing video images such as a video camera, still camera, webcam, scanner, or other suitable devices. In certain embodiments, the computing device 12 may control the image capture device 20, so that the processor 16 controls various parameters of the image capture device 20. For example, the image capture device 20 may be capable of toggling between capturing video images and still images, may activate or deactivate the image capture device 20, zoom the image capture device 20, pan the image capture device 20, alter frequency (e.g., frame rate) or resolution of the captured images, and/or adjust various suitable properties of the image data captured by the image capture device 20. In some embodiments, the processor 16 is capable of optimizing and/or otherwise altering the image data prior to storing the image data in memory 18.

As depicted, the visual control system 10 may be optimized to capture movements of the user 14 by detecting movements of the user 14. For example, in some embodiments, the visual control system 10 may be configured to interpret hand movements of the user 14 to derive a gestural reduced instruction pose expression (GRIPE) notation, Labanotation, Hamburg Notation System (hamnosys), signing gesture markup language (SIGML), and/or other notations that may then be used to store the user movements (e.g., GRIPE movement list) in the memory 18. Additionally or alternatively, some embodiments of the visual control system 10 may be configured to track the movement of a presentation wand 22 in addition to or instead of tracking movement of hand movements. In certain embodiments, the wand 22 may assist in tracking hand gestures more precisely. For example, the wand 22 may transmit a signal (e.g., infrared light, colored light, radio waves) that may be tracked by the visual control system. In some embodiments, the presentation wand 22 may also be configured to control presentations, manipulate on-screen content, control image capturing, emphasize portions of a presentation (e.g., laser pointer), and/or other presentation functions. In certain embodiments, the visual control system 10 may be configured to receive and/or record information from one or more presentation wands 22. Moreover, in some embodiments, one or more presentation wands 22 may be included as part of a mobile computing device 24 or other input device configured to interface with the computing device 12. In such embodiments, the mobile computing device 24 may include a cellular phone, a tablet computer, a laptop computer, a personal digital assistant, or other similar devices As further discussed below, the computing device 12 includes a capture application 26 including non-transitory machine readable computer instructions stored in memory 18 and executed by the processor 18. This capture application 26 may control the image capture device 20 via the processor 18. In certain embodiments, the capture application may include one or more applications stored in the memory 18. For example, the capture application 26 may include a separate program that the user 14 may select, or the capture application 26 may be embedded within an operating system for the computing device 12 and/or embedded within firmware and/or drivers for the image capture device 20. The capture application 26 may interface with a legacy application 38, for example, by using a series of recorded movements and other techniques described in more detail below with respect to FIG. 2. Indeed, rather than use an API or custom interface code, the techniques described herein may capture visual movement and use the captured movement to control and/or interface with the legacy application 38.

Figure 2:
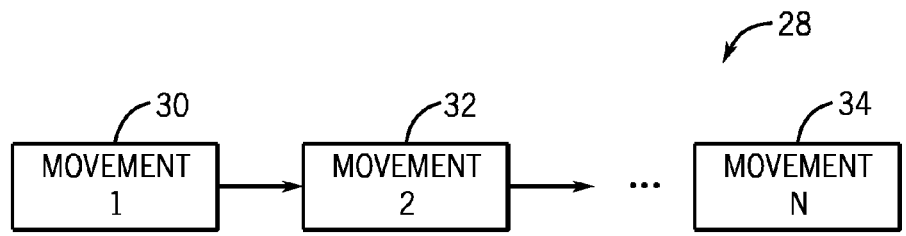
FIG. 2 illustrates a block diagram view of embodiments of a recorded series of movements that may be captured by the visual control system of FIG. 1.

FIG. 2 illustrates a block diagram view of an embodiment of a recorded series of movements that may be recorded by the capture application 26. Once certain movements of the user 14 (e.g., hand movements, facial expressions, body movements, and/or wand 22 movements) are captured via the image capture device 20, the captured movements of the user 14 are recorded within the memory 18 as a recorded series of movements 28. The captured movements may include static movements (e.g., a hand position, palm orientation, thumb orientation, wand orientation) and/or dynamic movements (e.g., a hand movement up; down; left; right; a wave; rotation of the wrist, change in orientation of fingers, palm, and/or wand). For example, the series of movements 28 may include a first movement 30, a second movement 32, and a last movement 34. In other embodiments, the recorded series of movements may include 1, 2, 3, 4, 5, or more movements, e.g., 1 to 100 or more movements. In some embodiments, the recorded series of movements 28 may be stored as individual movements of the user 14 (e.g., store using GRIPE notation) or the movements may be converted to some other data format prior to storing the commands in the memory 18. For example, in some embodiments, the movements may be converted to and stored as commands that may be used by the capture application 26. Moreover, in some embodiments each movement 30, 32, and 34 of the recorded series of movements 28 may correspond to one command in one-to-one ratio between movements and commands for an application, such as the legacy application 38.

In other embodiments, at least one command may correspond to multiple movements. Additionally or alternatively, multiple commands may correspond to a single movement. In some embodiments, the commands may include commands to: start recording, stop recording, select a menu item, advance through a menu, open additional programs, zoom and pan within windows, resize windows, open windows, close windows, and/or other suitable application manipulations. Additionally, in certain embodiments, the recorded series of movements 28 may include a pre-determined number of commands (e.g., 1, 2, 3, or more commands). Other embodiments of the recorded series of movements 28 may include user defined limits to the number of movements. For example, in such embodiments, the first movement 30 may correspond to a start recording command, and the last movement 34 may correspond to a stop recording command. In such embodiments, the first movement 30 and/or the last movement 34 may be concatenated from the recorded series of movements 28 before the recorded series of movements 28 is saved in the memory 18.

Returning to FIG. 1, in addition to the image capture device 20, the visual control system 10 may include a microphone 36 that is configured to capture audio signals, such as voice commands uttered by the user 14. In such embodiments, the processor 16 is capable of storing the audio signals in addition to captured movements of the user 14. In certain embodiments, the audio signals may be stored separately from the stored movements and may be accessed when the recorded series of movements 28 recorded along with the audio signal is accessed. In other embodiments, the audio signals may be converted to a movement and stored within the related recorded series of movements 28. Indeed, the audio signals may be used in lieu of or additional to visual movements, but may be converted and stored into movements by the techniques described herein. For example, an audio command like "zoom in" may be converted to an equivalent "zoom in" visual movement and stored as the "zoom in" visual movement. Any number of audio commands, such as "record," "stop," and "select" may be converted and stored as a movement. Indeed, the audio signals and the movements may both be converted to similar data formats (e.g., GRIPE) and stored in the memory 18. For example, the movements and audio signals may be translated to and stored as commands that may be used by the capture application 26. To insure that the audio and visual commands are received in proper order, some embodiments may synchronize the audio visual commands during recording so that an earlier issued command (e.g., either audio or visual) is stored prior to a later issued command (e.g., audio or visual command).

In certain embodiments, the recorded series of movements 28 may be used to control the capture application 26. As mentioned above, the capture application 26 may record the recorded series of movements 28 and/or control the legacy application 38 that may be communicatively connected to the capture application 26. In some embodiments, the capture application 26 may be suitable of performing other functions in addition to capturing the movements 30, 32, 34 of the user. For example, in some embodiments, the capture application 26 may be used to enable teleconferencing through the computing device 12 and/or provide operating system functions (e.g., save file, open file, print file, launch application, close application) for the computing device 12 while incorporating a capturing function embedded within the capture application 26 suitable for capturing the movements 30, 32, and 34. In other words, the capture application 26 may be any application that is configured to receive controls from the user 14 through image capture device 20 and/or microphone 36 such as the Mezzanine™ platform made available by Oblong Industries, Inc., of Los Angeles, Calif. The legacy application 38 communicatively coupled to the capture application 26 may include Sluice and GeoView both available from General Electric Company of Schenectady, N.Y. However, in some embodiments, the user 14 may desire to perform actions that may not be provided in the capture application 26, or the user 14 may to desire to control an additional application, such as additional legacy applications 38.

In certain embodiments, the legacy application 38 may include any application that is not incorporated within the capture application 26. For example, the legacy application 38 may include power network management applications such as Sluice, GeoView, GENe, XA/21 and the PowerOn™ suite each made available by General Electric Company of Schenectady, N.Y., as well as other similar network management applications. Specifically, the applications may include Energy Management Systems (EMS) applications, Demand Response Management Systems (DRMS) applications, Distribution Management Systems (DMS) applications, Outage Management Systems (OMS) applications, Geospatial Information Systems (GIS) and/or other suitable power network management applications.

Furthermore, the illustrated computing device 12 may include one or more displays 40 that may display information provided by the computing device 12. For example, the display 40 may display information provided by the capture application 26, the legacy application 38, other applications stored in the memory 18 and/or other applications wirelessly connected to the computing device 12. Moreover, the illustrated embodiment of the computing device 12 couples to two displays, but other embodiments of the computing device 12 may couple to 1, 3, 4, or more displays 40 configured to display information provided by the computing device 12. The displays 40 may share a single workspace displayed across multiple screens. Further, each display 40 may be included in a monitor, a tablet, a cell phone, a laptop, a screen projector, a web browser and so on. A workspace may enable different users communicatively coupled via a network to share content and applications interactively with any other user, including users at other geographic locations. For example, a first user may take control of the wand 22 (and/or use hand and other body gestures) at a first geographic location and use the wand 22 (and/or hand and other body gestures) to interactively control any number of applications in the workspace, which may be displayed by all displays 40. A second user at a second geographic location may then ask for or receive control of the workspace, and similarly take interactive control of the workspace. The second user's actions may then be presented by all of the displays 40. Indeed, application sharing, whiteboarding, video conferencing, and real-time collaboration may be provided by using a shared workspace, including sharing the workspace in various geographic locations.

Figure 3:
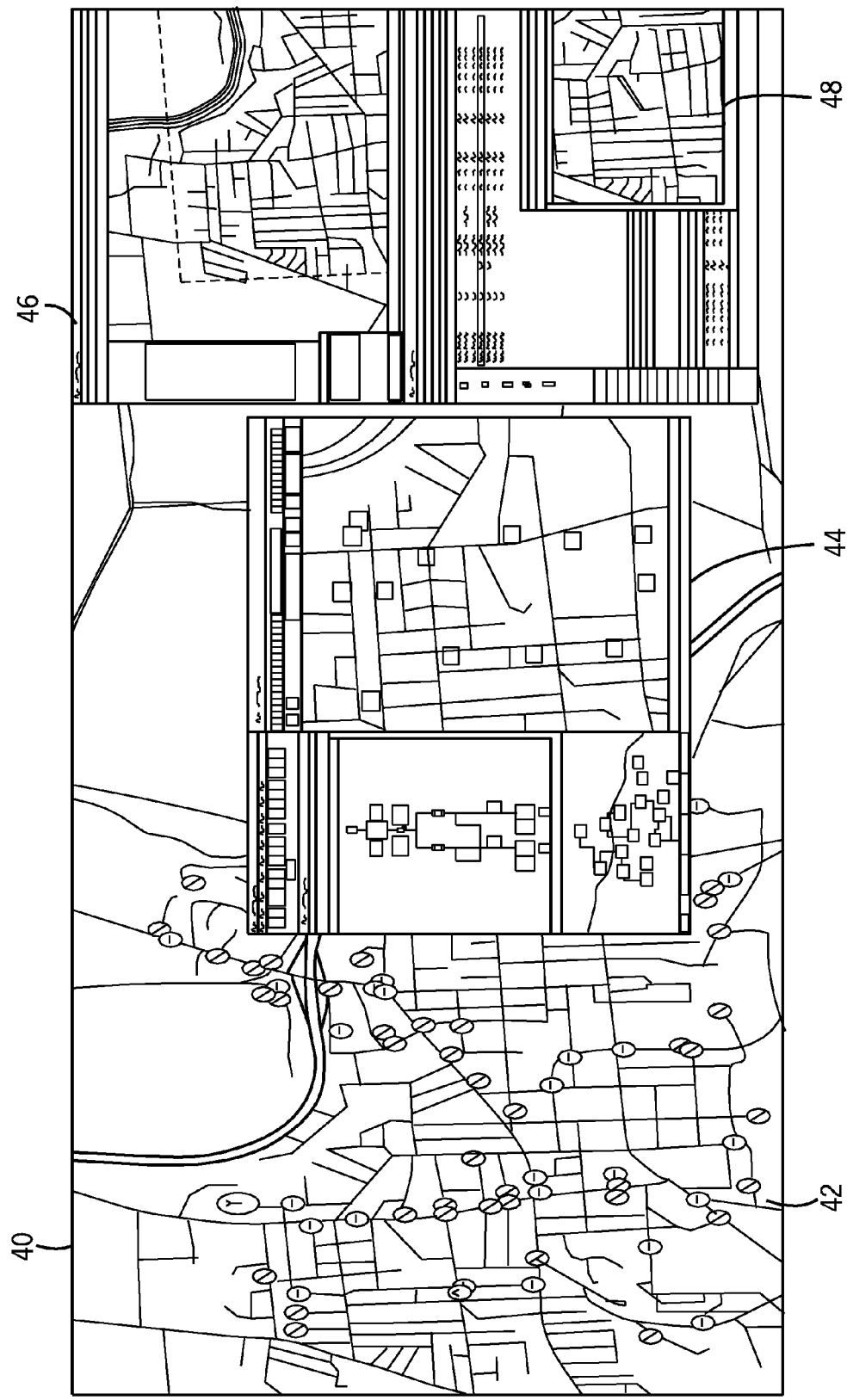
FIG. 3 illustrates an embodiment of the display of FIG. 1 illustrating legacy applications.

It may be useful to describe more details of the legacy application(s) 38, such as legacy applications 38 useful in power network management. Accordingly, FIG. 3 illustrates an embodiment of the display 40 illustrating various legacy applications 38. The capture application 26 may be used to control any one or more of the legacy applications 38. For example, in some embodiments, the legacy applications 38 may be displayed on or more displays 40. For example, in some embodiments, the display 40 may be used to display all of the legacy applications 38. In such embodiments, the legacy applications 38 may be executed on a single computing device (e.g., computer or server). In other embodiments, one or more of the legacy applications 38 may be executed on one or more computing devices and combined on one display 40. For example, video from one or more computing devices may be combined on the display 40 using video muzzling, such as the window sharing capabilities integrated in the Mezzanine™ platform. In further embodiments, the displayed legacy applications 38 may be distributed across one or more displays 40.

In certain embodiments, the display 40 may display one or more legacy applications 38. Although the illustrated embodiment of the display 40 shows 4 legacy applications 38, other embodiments are configured to concurrently display 1, 2, 3, 5, 6, or more legacy applications 38. In the illustrated embodiment of the display 40, the displayed legacy applications 38 include Insight 42, a DMS application 44, a GIS application 46, and an OMS application 48. Other embodiments of the display 40 may include one or more other suitable power network management systems in addition to or in place of one or more of the illustrated legacy applications 38. For example, the legacy application 38 may include an EMS application that may be used to centrally monitor, analyze, optimize, simulate and control generation and transmission assets in real time. A DRMS application may be used to dispatch load resources according to demand to optimally achieve load demand while taking various risks and rewards of a dispatch plan into the optimization. The DMS application 44 may be used to manage renewable generation of power, implement grid efficiency improvement measures, and control isolation and restoration of outages. The GIS application 46 may be used to model network infrastructures that may experience complex network asset management problems, such as electrical, telecommunications, gas, water, and public utilities. The OMS application 48 may be used to provide network management and advance workflow outage restoration support during storm conditions.

Figure 4:
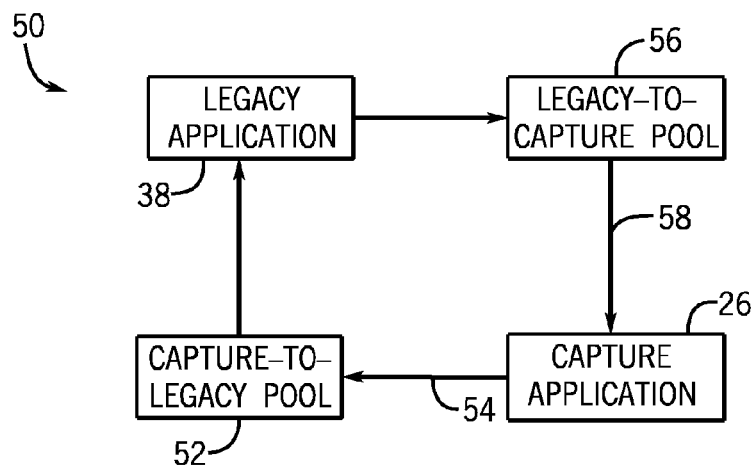
FIG. 4 illustrates a diagram view of an embodiment of a communication path between the legacy application and capture application of FIG. 1.

FIG. 4 illustrates an embodiment of a communication path 50 between the capture application 26 and a legacy application 38. The capture application 26 may include various tools to integrate pixels recorded by the capture application 26 with actions of the legacy application 38. For example, movements captured by the capture application 26 may be sent as a list of commands (e.g., mouse clicks, mouse movements, keyboard presses, and/or keyboard shortcuts derived from movements recorded in the capture application 26) that may be sent to the legacy application 38. Specifically, the capture application 26 captures movement commands from the user and stores the movements and/or sends them to a capture-to-legacy pool 52 as one or more proteins 54.

The proteins 54 may be similar to data structures, albeit more flexible, and may contain information deposited by the capture application 26 several times per second, for example, at a frequency of approximately 10-50 Hz, into the pool 52. Proteins 54 may be made up of two parts (each one being a slaw): descrips and ingests. Descrips may be slaw strings, and ingests may be key-value pairs, where the key is a string. Slaws are data units having the ability to store multiple types of data, including an unsigned multi-bit integer (e.g., 64 bit integer, 128 bit integer), complex number, boolean, vector, string, and/or a list. In some embodiments, the protein 54 may be composed of one or more data structure units that are arbitrarily composed but may be self-describing, structured, and/or typed. An example protein 54 format is as follows:

Protein Format
  Descrips:
    remote-pointing
    version.2.0
  Ingests:
    provenance: [string]
      This string identifies the input device, so that the application can deal with multiple concurrent input streams.
    touch: [integer 0..2]
      This ingest represents the current interaction state:
        0=the user is not touching the display/not moving the pointer
        1=the user is touching the display/moving the pointer
        2=the user is hardening/dragging (button pressed)
    mode: [integer 0..1]
      This ingest contains information regarding how to interpret the values in vect (see below):
        0=pointing updates are relative
        1=pointing updates are absolute
    vect: [three floating point components vector]
      This ingest contains pointing move information. Instantaneous (if mode==0) or absolute (if mode==1) values for the horizontal and continuous pointing motion are stored in the first and second component of the vector. The third component is not currently used. The values represent either the linear or angular change along a specific axis since the last protein.
    swipe_direction: [integer 0..4]
      This ingest contains discrete swipe information. This value will almost always be zero (i.e. no swipe), and will have a value between 1 and 4 if a discrete swipe is detected. Discrete swipes are only detected and sent when the user is not hardening (see above). These are the meanings for the different values:
        0=no swipe
        1=swipe up
        2=swipe right
        3=swipe down
        4=swipe left
    swipe_x: [floating point]
    swipe_y: [floating point]
      This ingest contains instantaneous values for the horizontal and continuous swipes, the values, either linear or angular depending on the implementation, represent the change since the last protein, and are measured and sent only if the user is hardening (see above).
    angle: [floating point]
      This ingest contains the absolute (roll) angle (in degrees) around the main axis of the device. The angle is reset to zero every time the user touches the display/starts to send pointing motion data.
    number-of-touches: [integer]
      This ingest contains the number of fingers currently touching the device display. Not currently used in any implementation.

An example protein 54 instance may be as follows:

```
% YAML 1.1
% TAG ! tag:oblong.com,2009:slaw/
— !protein
descrips:
  remote-pointing
  version.2.0
ingests:
  touch: 0
  vect:        !vector        [0.03338855504989624,
    0.0037169046700000763, 0.0]
  ratchet_state: 0
  swipe_direction: 0
  number-of-touches: 0
  provenance: iOS3f777e
  mode: 0
  swipe_y: 0.0
  angle: 59.585534966724609
  swipe_x: 0.0
```

The capture-to-legacy pool 52 is a directional communication channel from the capture application 26 to the legacy application 38. The pool 52 may be a multi-point contact that allows one or more legacy applications 38 to connect to the pool 52 along with the capture application 26 without making any changes to any other applications connected to the pool 52. In some embodiments, the capture-to-legacy pool 52 may be implemented as a ring buffer (e.g., a circular data structure using a buffer as if it were connected end-to-end). Although the pool 52 contains proteins 54 that are arbitrarily composed (e.g., contain any type of data), the pool 52 may control the order of data sent from the capture application 26 to one or more legacy applications 38. For example, in some embodiments, the pool 52 may be used as a queue that sends data to one or more legacy applications 38 in the order sent from the capture application 26. In certain embodiments, the data may be sent from the pool 52 to one or more legacy applications 38 upon receiving each movement from the capture application 26. In other embodiments, a batch of movements may be sent after a certain number of movements have entered the pool 52. For example, in some embodiments, data may be sent from the pool 52 to the legacy application 38 after a set number of movements have occurred, such as 2, 3, 4, 5, or more movements. In other embodiments, data may be sent from the pool 52 to the legacy application 38 after a full command is detected, such that commands composed of one movement are sent after the one movement is detected by the computing device 12, but multi-movement commands are received after the full string of movements composing a command is detected by the computing device 12. As discussed below, the recorded series of movements 28 may be invoked by the user 14. When the user 14 invokes the recorded series of movements 28, the recorded series of movements 28 may be invoked and sent as one packet of data to the legacy application 26 at one time. As can be appreciated, invoking the recorded series of movements 28 may be faster that the user's movements, thereby increasing the efficiency of the user while operating the computing device 12.

In addition to sending information from the capture application 26 to the legacy application 38, return information may be sent through the communication path 50 through the legacy-to-capture pool 56 as a protein 58. The legacy-to-capture pool 56 may be constructed similarly to pool 52, and the protein 58 may be similar to the protein 54. The return information may include displayed images, queries, and/or responses to the commands sent via pool 52. For example, the legacy application 38 may ask for additional information and/or show more available navigation choices after a command is sent from the capture application 26 to the legacy application 38. In some embodiments, the capture application 26 may present the information to the user and/or capture more movements from the user to navigate through and/or control the legacy application 26. By utilizing, for example, a round-robin approach to send and receive data via the pools 52 and 56 in a circular fashion, the techniques described herein enable a more efficient interface between the legacy application 38 and the capture application 26.

Figure 5:
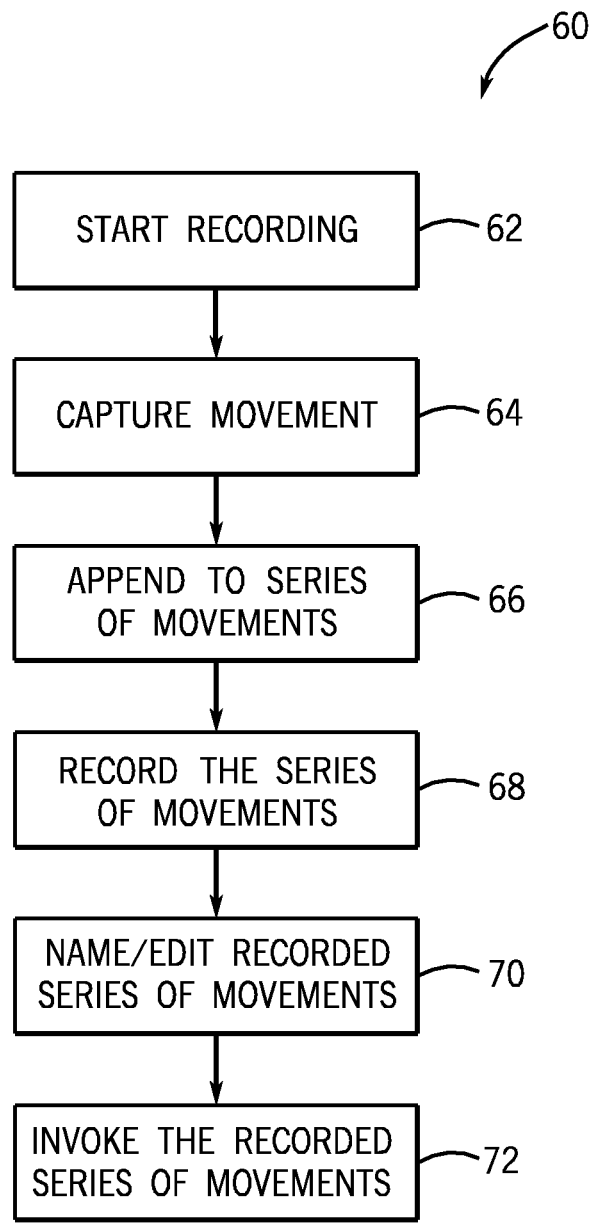
FIG. 5 illustrates a diagram view of an embodiment of a process for controlling the legacy application of FIG. 1 through the capture application of FIG. 1.

FIG. 5 illustrates an embodiment of a process 60 for controlling a legacy application 38 through the capture application 26. The process 60 may be included in non-transitory computer instructions or code stored in a machine-readable medium, such as the memory 18. The process 60 may begin by starting a recording of movements (block 62). In some embodiments, the recording begins when the user 14 initiates recording using the image capture device 20, the wand 22, the mobile computing device 24, the microphone 26, and/or another suitable input device, such as when the first movement 30 corresponds to a start recording command. The captured movements may be stored in the memory 18 using GRIPE and/or another suitable notation. In other embodiments, recording begins upon the detection of a movement. Before or after recording, the processor 16 may cause the motion capture device 20 to capture movements of the user 14 (block 64). The recorded movement may then be used to create a new series of movements or appended to a recorded series of movements 28 already stored in memory 18 (block 66).

The recorded series of movements 28 then may be recorded to the memory 18 using GRIPE or another suitable notation (block 68). In some embodiments, the recording of the movements 28 may be first converted to a corresponding series of commands (e.g., clicks through a navigation pane, mouse movements, keyboard presses, and/or keyboard shortcuts derived from movements recorded in the capture application 26). Once the series of movements are recorded (block 68), the processor 18 enables the user to name the series of movements and/or edit the series of movements (block 70). In some embodiments, upon recording the movements, the processor 18 causes one or more displays 40 to present a user interface to the user 14 and/or causes the mobile computing device 24 to present a user interface configured to edit the recorded series of movements 28. In other embodiments, the series of movements is recorded and a user may invoke a menu that allows the user to edit or name the recorded series of movements using the computing device 12, the mobile computing device 24, or a remote computing device connected to the computing device 12. For example, the recorded movements 28 may be reordered, certain movements may be deleted, certain movements may be added, and certain movements may be updated. Likewise, data in the proteins 54, 58 may be edited (e.g., updated, inserted, deleted). Once the series of movements has been recorded, the processor 18 presents a menu via the display 40 and/or the mobile computing device 25 that enables the user to invoke the recorded series of movements (block 72).

Additionally or alternatively, in some embodiments, the conversion of the series of movements may be edited such that the significance of recorded movements may be altered. In other words, the correspondence between gestures and commands may be changed. For example, a gesture that may correspond to a click in a navigation window may be redefined as a scrolling action or another command in the legacy application. For example, a specific movement of the thumb when the hand is in a certain position may be mapped to any number of different legacy application 38 commands.

Technical effects of the invention include using movements to control legacy applications without making direct changes to the code of legacy applications or developing an API for the legacy application 38 and/or the capture application 26. Accordingly, different legacy applications 28 may be interchanged more quickly and more cheaply than systems that use special API development for each interface between a legacy application 38 and a capture application 26. Additionally, the series of movements may be saved, edited, and/or named to be recalled by a user to control the legacy application 38. By saving and recalling a recorded series of movements 28, user productivity may be increased due to less time used to perform precise movements to achieve a desired result whether the desired result includes navigating or controlling the legacy application 38.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling a legacy application, comprising:
   visually capturing a series of movements;
   recording the series of movements at a first time as a recorded series of movements, wherein the recorded series of movements comprises at least a command that is configured to control a legacy application;
   editing the recorded series of movements, wherein the recorded series of movements comprise visually captured movements of a user comprising two or more recorded gesture types; and
   invoking the recorded series of movements at a second time.

2. The method of claim 1, wherein editing the recorded series of movements is performed at a third time.

3. The method of claim 2, wherein editing of the recorded series of movements comprises using a mobile computing device.

4. The method of claim 1, wherein recording the series of movements comprises receiving user input to record a name for the recorded series of movements.

5. The method of claim 1, wherein recording the series of movements comprises using an image capturing device.

6. The method of claim 5, wherein using the image capturing device comprises using a wand configured to assist the image capturing device in capturing the series of movements.

7. The method of claim 1, wherein recording the series of movements comprises capturing voice commands and integrating the voice commands into the recorded series of movements.

8. The method of claim 1, comprising controlling a legacy application by using the recorded series of movements and without using a legacy application programming interface configured to control the legacy application, wherein the legacy application is configured to manage an electrical network.

9. A system, comprising:
   at least one processor;
   a memory communicatively coupled to the at least one processor;
   an image capturing device configured to record a series of movements in the memory at a first time as a recorded series of movements, wherein the recorded series of movements comprises at least a command that is configured to control a legacy application;
   an editing interface configured to enable a user to edit the recorded series of movements, wherein the recorded series of movements comprise visually captured movements of a user comprising two or more recorded gesture types; and
   an input interface configured to invoke the recorded series of movements at a second time.

10. The system of claim 9, wherein the input interface comprises a mobile computing device remote from the at least one processor.

11. The system of claim 10, wherein the mobile computing device comprises an editing interface configured to edit the recorded series of movements.

12. The system of claim 9, comprising a microphone configured to capture voice commands associated with the series of movements.

13. The system of claim 9, wherein the legacy application is configured to manage an electrical network.

14. The system of claim 9, wherein the at least one processor derives a plurality of user interface commands configured to navigate through a user interface included in the legacy application based on the recorded series of movements.

15. The system of claim 14, wherein an execution of the plurality of user interface commands by the at least one processor is faster than a playback of the recorded series of movements by the at least one processor.

16. The system of claim 9, comprising a display, wherein the series of movements comprises movements where a user is not touching the display.

17. A visual control apparatus, comprising:
   an image capture device configured to capture a series of movements;
   a memory configured to record the series of movements as a recorded series of movements, wherein the recorded series of the movements comprises at least a command that is configured to control a legacy application;
   an editing interface configured to enable a user to edit the recorded series of movements, wherein the recorded series of movements comprise visually captured movements of a user comprising two or more recorded gesture types; and
   a user interface application configured to invoke or to edit the recorded series of movements.

18. The apparatus of claim 17, wherein the legacy application is configured to manage an electrical network.

19. The apparatus of claim 17, comprising a communication interface configured to transport the recorded series of movements to the legacy application through one or more pools as a protein.

20. The apparatus of claim 19, wherein each pool is a queue implemented as a ring buffer, and wherein the protein is a self describing data structure unit.

* * * * *